Figure 1:
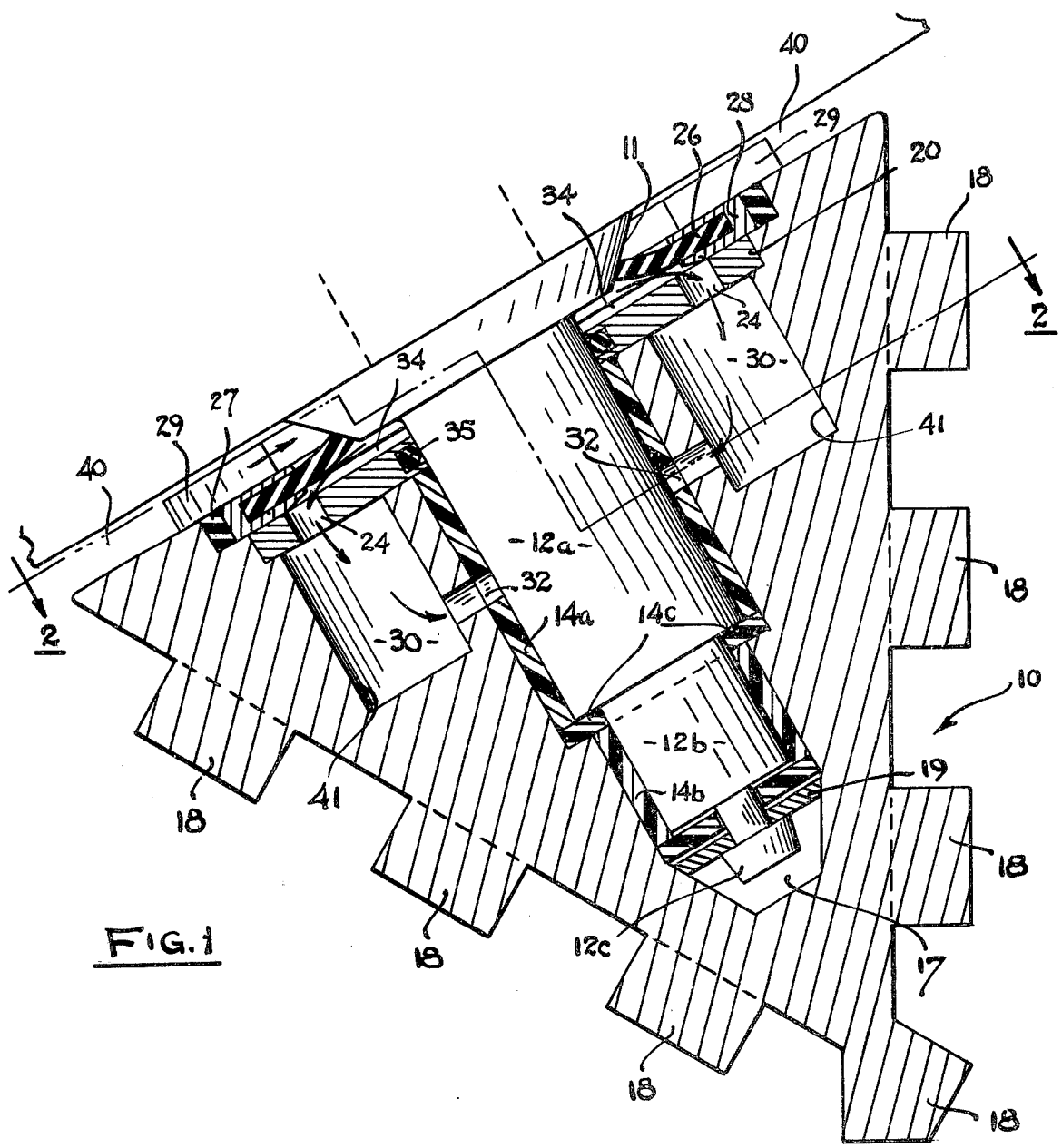

United States Patent [19]

Bodine et al.

[11] 4,156,470
[45] May 29, 1979

[54] ROTARY EARTH BORING DRILL BIT WITH CENTRIFUGAL FOREIGN PARTICLE BARRIER DEVICE

[75] Inventors: Albert G. Bodine, 7877 Woodley Ave., Van Nuys, Calif. 91406; Ernest A. von Seggern, Burbank, Calif.

[73] Assignee: Albert G. Bodine, Van Nuys, Calif.

[21] Appl. No.: 889,939

[22] Filed: Mar. 24, 1978

Related U.S. Application Data

[63] Continuation-in-part of Ser. No. 698,286, Jun. 21, 1976, Pat. No. 4,091,988.

[51] Int. Cl.² .............................................. E21B 9/35
[52] U.S. Cl. .................................... 175/313; 175/315; 175/337; 175/340; 175/372
[58] Field of Search ............... 175/102, 227, 228, 229, 175/313, 315, 337, 340, 371, 372; 210/84, 520

[56] References Cited

U.S. PATENT DOCUMENTS

| | | | |
|---|---|---|---|
| 4,049,066 | 9/1977 | Richey | 175/323 |
| 4,091,988 | 5/1978 | Badine | 233/1 R |

*Primary Examiner*—William Pate, III

*Attorney, Agent, or Firm*—Edward A. Sokolski

[57] ABSTRACT

A drilling bit for drilling earthen material such as an oil well rotary cone drilling bit, which includes means for preventing foreign particles such as sand, rock cuttings, etc., from reaching the rotational bearings of the bit cones. This end result is principally achieved by means of a centrifugal slinger disc or wall which is positioned in external concentricity with the drill bit cone bearing, and operates to drive granular particles away from the bearings, thereby preventing such particles from reaching these bearing surfaces. The granular particles are driven by the slinger action through a series of apertures forming a channel running out to a peripheral region of the bit cones. A channel continuation is also provided for lubricating fluid, which many comprise ambient water or oil placed in chambers surrounding the bearings, this channel providing access for such lubricating fluid inwardly to the bit cone bearings. A ring member carrying a plurality of curved vanes, this ring member being externally concentric with the supporting shaft of the cone and located near the outer periphery of the bit cone, may also be employed to prevent larger foreign particles, such as cuttings, from entering into the region of said slinger.

10 Claims, 2 Drawing Figures

ROTARY EARTH BORING DRILL BIT WITH CENTRIFUGAL FOREIGN PARTICLE BARRIER DEVICE

This application is a continuation in part of our application Ser. No. 698,286, filed June 21, 1976 now U.S. Pat. No. 4,091,988.

This invention relates to rotary drill bits for drilling earthen material, such as in the drilling of oil wells, and more particularly to such a device which employs centrifugal drive means for preventing the passage of granular particles to the bit support shaft bearings.

Conventional roller cone bits which are often utilized for drilling oil wells, must operate in an environment which includes a considerable amount of abrasive material such as mud and sand, as well as the cuttings generated by the bit. The bearings of such bits generally do not have a very long life span in view of the fact that these abrasive particles get into the bearings and wear them out rather rapidly. Attempts have been made in the prior art to relieve this problem by employing rotary shaft seals which are used to retain oil around the shaft bearings of the bit. It has been found however that mud and other foreign particles become imbedded in the elastomer seal for the bearings, causing it to act as an abrasive lap which cuts away the mating surfaces. Eventually the seal fit becomes so loose that it loses its sealing effect, permitting the abrasive material to get into the bearing. Also, in drilling at greater depths, the temperature of the earth increases. This combined with the heat generated by the drilling operation tends to cause structural failure of the elastomer of the seal.

The present invention obviates the need for a seal, thereby avoiding the aforementioned problems of the prior art. At the same time, highly effective means are employed to prevent abrasive foreign material from reaching the bearings of the roller cone, this end result being achieved by means of a centrifugal slinger device which operates in conjunction with a channel structure to permit lubricant which may be provided from the ambient supply or water or from oil placed in chambers to selectively reach the cone shaft bearings. This device, at the same time, acts as a barrier to prevent particulate material from reaching such bearings.

Briefly described, our invention is as follows:

A slinger disc is mounted on or made a part of the bit cone for rotation therewith in external concentricity with the bearings, which may be sleeve bearings on which the bit cone is rotatably driven about a support shaft. The slinger disc extends radially outwardly from the bearings and has apertures combined therewith to permit fluid to flow therethrough into a series of chambers in said cone which surround at least a portion of the bearings and are in fluid communication therewith. Oil may be placed within the chambers for use in lubricating the bearings, this oil being retained by means of a flap seal during shipping and whenever the bit cone stops rotating, or ambient water may be solely employed for lubrication. A plurality of channels are provided, these channels running from the chambers through apertures in the slinger disc region and thence through the flap valve and the outer wall of the bit cone, while the bit is rotating and the flap valve is driven to an open position by virtue of centrifugal force. A ring may also be provided near the outer entrance (or exit) of the channel, this ring having a plurality of curved vanes thereon which operate to drive out larger particles such as rock cuttings, preventing them from initially entering the channel. In operation, the rotating slinger disc structure drives particulate material outwardly, tending to prevent such material from reaching the bit bearings, some of these particles passing through the open flap valve and out through the channels formed in the bit cone with most of the particulate material being centrifugally "nailed" against the outer walls of the chambers in the cones. The chambers and associated channels and apertures form a U-tube configuration which operates to convey clean lubricant to the bearings and to drive the particulate material away from the bearings.

It is therefore an object of this invention to provide means for avoiding the damage of drill bit bearings by particulate foreign material.

It is a further object of this invention to obviate the need for sealed bearings in earthen material rotary drill bits.

It is still another object of this invention to provide an improved oil drill bit which employs centrifugal means for preventing particulate material from entering the bit bearings.

Figure 2:
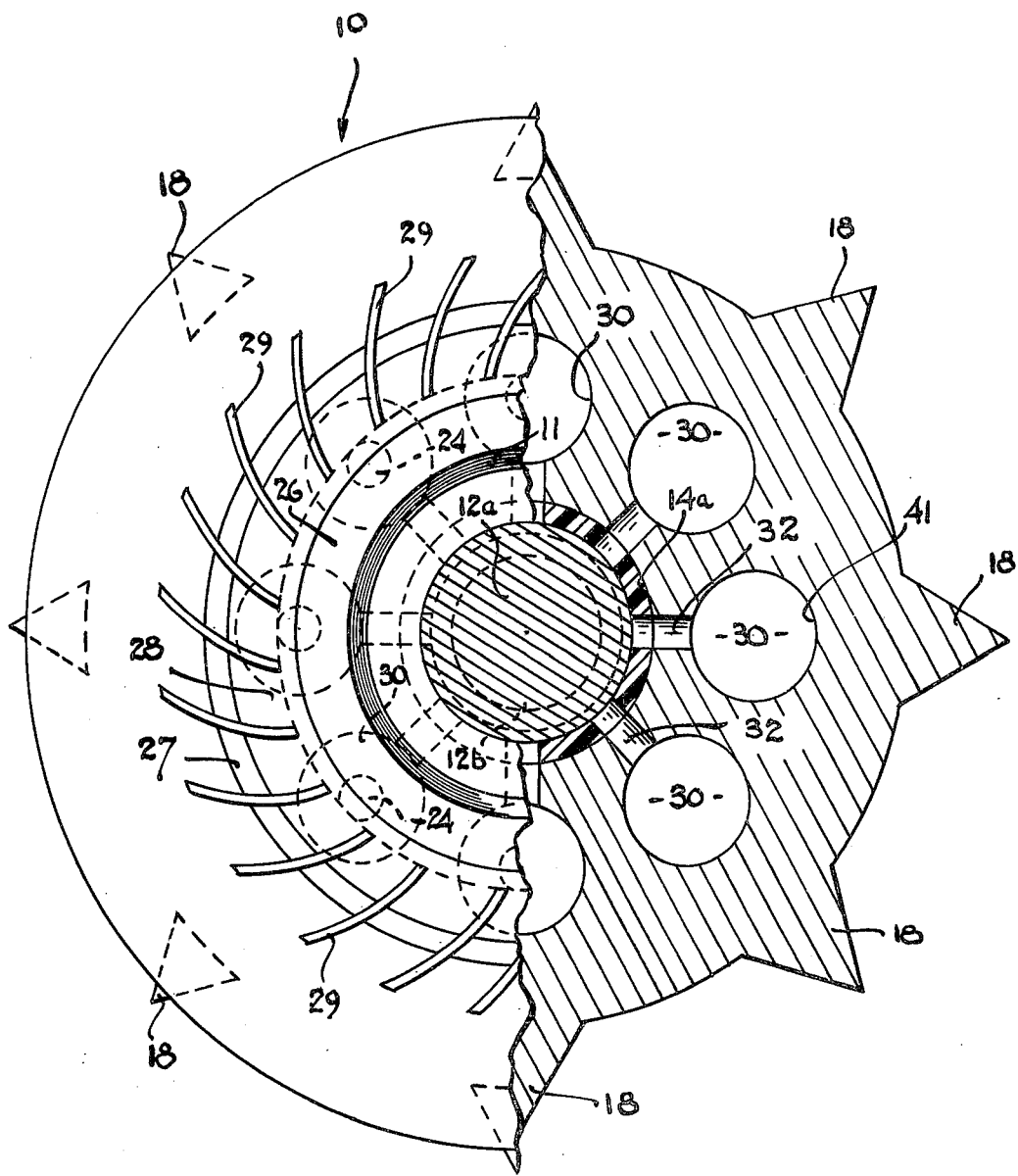

Other objects of this invention will become apparent as the description proceeds in connection with the accompanying drawings, of which:

FIG. 1 is a cross-sectional view of a preferred embodiment of the invention; and FIG. 2 is a cross-sectional view taken along the plane indicated by 2—2 in FIG. 1.

Referring now to the Figures, a preferred embodiment of the invention is shown. Drill bit member 10 in the illustrative embodiment is of the roller cone type which is employed for drilling oil wells, and has a plurality of teeth 18 formed therearound. Such roller cone bits are manufactured by a number of manufacturers including Smith Tool, Irvine, California, and Reed Tool Company, Houston, Texas.

The bit 10 is rotatably mounted on a bearing pin which includes two cylindrical sections, 12a and 12b, the latter of these sections being stepped down in diameter to provide bearing support for the small end of the cone. The bit has a hollowed out central portion 17, which has stepped cylindrical sections to mate with bearing pin sections 12a and 12b. The inner walls of hollowed out portion 17 have sleeve bearings 14a, 14b and 14c fixedly attached thereto or formed thereon. These bearings may be made of a highly durable material such as fabric-phenolic, or of nitralloy, which will work with water as part or all of its lubricant. It is to be noted that the invention can be used to equal effect with bits employing conventional roller and ball bearings. The bearing pin also includes a cap 12c which operates to retain the bit on the pin, this cap abutting against disc shaped inner wall portion 19 of the bit.

Disc member 20 is fixedly attached to or a part of the bit cone and rotates therewith, this disc member being externally concentric with bearing pin portion 12a. Disc 20, as to be explained further on in the specification, operates as a slinger in the same general fashion as the slingers described in our aforementioned patent application, to drive particulate material centrifugally outwardly, away from the bearings. Disc 20 has a plurality of fluid passages or ports 24 located in the outer portion thereof.

A plurality of cavities 30 are spaced within cone 10 around pin portion 12a, these cavities being in fluid communication with apertures 24 formed in disc 20 and with channels 32 which extend to the surfaces of the pin portion 12a through the bearing material of sleeve bearing 14a. A flap ring seal 26 is supported on an inner wall of the bit cone by means of holder 28, the ends of this seal abutting against sloped shoulder 11. A lubricant such as a suitable lubricating oil may be placed in chambers 30, this oil being retained within these chambers during shipping and when rotation of the bit is stopped during drilling operations by means of seal 26.

It is to be noted that during rotation of the drill the ends of flexible seal 26 are driven outwardly away from shoulder 11 by the centrifugal force, thereby providing fluid communications from the outside of the bit to chamber 30 via passageways 40. Ring shaped member 27, which is an optional addition, is press fitted to the bit between seal holder 28 and an inner wall of the bit, this insert member carrying curved blades or vanes 29. These vanes rotate with the bit cone near the periphery thereof and operate to drive larger or heavier particles such as cuttings out through channels 40. An O-ring seal 35 may be provided along the inner edge of disc 20 but sealing at this point is not absolutely necessary in view of the fact that the operation of slinger disc 20 usually prevents particulate material from reaching this point.

The device operates as follows: With the bit rotating, a centrifugal force is generated in the space 34 where particulate material first meets the wall of rotating disc 20. The particulate material migrates radially outwardly to ports 24 and passes through these ports into chambers 30 and is held against the outer wall portions 41 of these chambers by the centrifugal force. The particulate material tends to force the lighter oil or clean water centrifugally separated therefrom through ports 32 to the bearing surfaces. Flap seal 26 also tends to open outwardly during rotation of the bit, such that a certain portion of the particulate material is centrifugally forced outwardly and further driven by vanes 29 out through channel 40.

The lubricating and particle barrier system employed is in the nature of a rotating "U-tube," with passageway 34 forming one leg of the "U," and a portion of chambers 30 and channels 32 forming the other leg, with the two legs being interconnected by ports 24 and the outer portions of chambers 30. Chambers 30 form the central interconnecting portions of the "U-tubes" and function as solids traps at the effective perimeter of the centrifuge formed thereby, while ends 32 of the "U"'s provide outlets to the bearings for clean lubricant, and at the opposite ends, passageways 34 form inlets to chambers 30 for water which initially may be combined with particulate material.

The device of the present invention thus provides a simple yet highly efficient means for avoiding the contamination of drill bit bearings with particulate material.

While the invention has been described and illustrated in detail, it is to be clearly understood that this is intended by way of illustration and example only and is not to be taken by way of limitation, the spirit and scope of this invention being limited only by the terms of the following claims.

We claim:

1. In a rotating drill bit mechanism having a shaft and bearing means lubricated by a lubricant for supporting said mechanism for rotation on said shaft, the improvement being a centrifugal separator unit mounted externally of said bearing means for separating solid particles from said lubricant, comprising:

a slinger disc member mounted externally of said bearings and extending radially outwardly therefrom, said disc member being attached to said mechanism for rotation therewith, fluid passageway means on one side of said disc member for conveying fluid from outside of said mechanism to the surface of said one side of said disc, chamber means formed in said mechanism for rotation therewith located on the side of said disc member opposite to said one side thereof, said disc member having port means formed therein for passing fluid from said fluid passageway means to said chamber means, and channel means for passing fluid from said chamber means to said bearing means, whereby said slinger disc member when rotated with said mechanism operates to centrifugally drive the fluid and solid particles outwardly away from said bearings and through the port means thereof into said chamber means wherein the particles are centrifugally separated from the fluid and are held against the outer walls of the chamber means while the fluid is passed through the channel means to the bearing means.

2. The mechanism of claim 1 wherein the fluid passageway means, the chamber means and the channel means form a "U-tube," with the passageway means and the channel means forming the legs of the "U" with the chamber means interconnecting said legs.

3. The mechanism of claim 1 wherein said chamber means comprises a plurality of separate chambers arranged about said bearing means.

4. The mechanism of claim 3 wherein said chamber means are substantially cylindrical in form and are arranged symmetrically about the bearing means.

5. The mechanism of claim 3 wherein the channel means comprises a separate channel running from each of said chambers to the bearing means.

6. The mechanism of claim 5 wherein the port means comprises a plurality of ports, each of which interconnects a separate one of said chambers with the fluid passageway means.

7. The mechanism of claim 1 and further including a plurality of vanes attached to the mechanism for rotation therewith, said vanes being located towards the outer periphery of said mechanism and in fluid communication with said fluid passageway means for preventing the entry of larger solid particles into said passageway means.

8. The mechanism of claim 1 and further including flap seal ring means supported on the inner wall of said mechanism, one side of said seal ring means facing said fluid passageway means, and second passageway means running from the other side of said seal ring means to the exterior of said mechanism, whereby said seal ring means blocks fluid communication between said first and second passageway means when the mechanism is not rotating and opens in response to centrifugal force to interconnect said first and second passageway means when the mechanism is rotating.

9. The device of claim 1 wherein said mechanism is a roller cone drill bit having a plurality of teeth formed therearound, the bearing means for said bit comprising a bearing pin having stepped cylindrical sections, the bit having a hollowed out central portion which mates with the bearing pin, the bearing means comprising bearings fixedly attached to said pin, the hollowed out portion of the bit being rotatably fitted on said bearing pin.

10. In a drill bit employing a roller cone,
a central cavity formed in said cone, said cavity having a closed end towards the apex of the cone and an open end at the base of the cone,
bearings formed within the walls of said cavity with a peripheral portion of said cavity outside the periphery of said bearings,
a bearing pin mounted on said bit, said bearings rotatably mounted on said bearing pin,
a disc-shaped wall member forming a slinger disc having a central aperture formed therein through which the pin passes in internally concentric relationship with said wall member, said wall member being mounted on said cone for rotation therewith near the base of the cone so as to partially close the open end of said cavity, and
port means including an opening formed in an outer peripheral portion of said wall member for providing fluid communications between said cavity and the outside environment of the cone,
whereby particulate material entering from outside the bit is forced outwardly by the centrifugal force generated by the disc shaped member with the rotation of the cone so as to pass through the opening in said wall member and is centrifugally trapped in said outer peripheral portions of said cavity away from said bearings.

* * * * *